United States Patent
Dahan et al.

(10) Patent No.: US 12,132,696 B1
(45) Date of Patent: *Oct. 29, 2024

(54) METHOD AND SYSTEM FOR SAVING SELECTED MESSAGES IN A CHAT FOR A FUTURE REPOST

(71) Applicants: Meir Dahan, Tiberias (IL); Eliahu Antopolsky, Zichron Yaakov (IL)

(72) Inventors: Meir Dahan, Tiberias (IL); Eliahu Antopolsky, Zichron Yaakov (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/777,572

(22) Filed: Jul. 19, 2024

Related U.S. Application Data

(63) Continuation-in-part of application No. 18/375,553, filed on Oct. 2, 2023, which is a continuation-in-part of application No. 18/205,566, filed on Jun. 5, 2023, now abandoned.

(51) Int. Cl.
*G06F 15/16* (2006.01)
*H04L 51/42* (2022.01)

(52) U.S. Cl.
CPC .................. *H04L 51/42* (2022.05)

(58) Field of Classification Search
CPC ........................................ H04L 51/42
USPC .......................................... 709/206
See application file for complete search history.

(56) References Cited

U.S. PATENT DOCUMENTS

| | | | |
|---|---|---|---|
| 7,124,272 B1 | 10/2006 | Kennedy | |
| 10,439,972 B1* | 10/2019 | Spiegel | H04L 51/216 |
| 2006/0149822 A1* | 7/2006 | Henry | H04L 63/08 709/206 |
| 2017/0091208 A1* | 3/2017 | Quan | G06F 16/44 |
| 2020/0204675 A1* | 6/2020 | Zhou | H04W 4/12 |
| 2022/0147206 A1* | 5/2022 | Zhai | G06F 3/04895 |

\* cited by examiner

*Primary Examiner* — Imad Hussain

(57) ABSTRACT

A computer system and method for saving and reposting a selected message in a chat that includes the steps of displaying a save for future repost button on a screen of the user's device, applying by this button a save for future repost mode on the selected message that is configured to save the selected message on a memory, continue saving the selected message after deletion of the selected message from the chat, after restarting the computing device of the user, and for a period of at least thirty days from applying this mode on the selected message. Displaying a repost button on the screen of the user's computing device, executing a repost command by the repost button for receiving the saved selected message from the memory and reposting on the screen of the computing device of the user the selected message received from the memory.

6 Claims, 2 Drawing Sheets

METHOD AND SYSTEM FOR SAVING SELECTED MESSAGES IN A CHAT FOR A FUTURE REPOST

RELATED APPLICATIONS

This application is a continuation in part of U.S. patent application Ser. No. 18/375,553 filed on Oct. 2, 2023, that is a continuation in part of U.S. patent application Ser. No. 18/205,566 filed on Jun. 5, 2023.

TECHNICAL FIELD

The present invention refers to a method and system for saving selected messages from the chat of a user and a contact of a communication application and for one-sided repost of the saved selected messages in the chat in the future.

BACKGROUND ART

Many users of communication applications, that are instant messaging software applications, such as Messenger™, Snapchat™, WhatsApp™, Telegram™, iMessage™ and the like, send one to the other messages, such as text messages, voice messages, video messages, photos, videos, emojis, files (PDF, word and in other formats) and the like. Sometimes the user wants to save one or more selected messages from the messages in the chat of the user and the contact in communication application and to repost these saved messages on his computing device in the future. The present invention provides a solution for this need.

Google chat provides an option to the user to send a reply to a specific incoming message that he received from the contact and by that to repost that incoming message again in the chat together with his reply. The present invention includes different steps and elements from Google Chat, and in general it is two different methods intended for different purposes. For example, the Google chat method does not save the selected message in a dedicated memory, and it is certainly not possible to repost after that incoming message after deletion from the chat, and these steps and elements are basic steps and elements of the present invention. In addition to that, Google chat does not have the step of displaying a save prevention button.

Prior art US 2020/0204675 A1 (Zhou) does not disclose any method or system for repost messages. Zhou discloses a method and system for sending messages in the chat, and for enabling the sender to determine that the message will be disappeared (vanished) from the chat within a period of time predefined by the system or selected by the sender in the settings. In paragraph Zhou explains that the aim of his invention is to make the messages automatically disappear form the devices of the sender and the contact. Zhou says nothing about saving messages for future repost. In paragraph Zhou explains that his mention comes to enable the sender to determine his preferable time after which the message will be vanished and that the interface for determining this time will be within the chat and not in another interface that can be found in the settings. In paragraph Zhou describes a trigger interface with valid duration in which the message will remains in the chat before being vanished and the sender can select the time duration of the message in the chat. The fact that Zhou describes a copy button, a forward button and a delete button has nothing to do with the present invention and with the method and system for saving and reposing elected message. Such buttons are known anyway from the beginning of usage of communication applications.

Prior art US 2006/0149822 A1 (Henry) does not disclose any method or system for repost messages. Henry discloses a cut and paste message option, which too is known since the beginning of the communication applications. Cut and paste message is not a save for future repost messages. Henry does not disclose any method or system that applies save for future repost mode that is configured to save the selected message on a memory used by the communication application, and continue saving the selected message on that memory in the save for future repost mode while the selected message is in the chat, after deletion of the selected message from the chat, after restarting the computing device of the user, and for a period of at least thirty days from the moment of applying the save for future repost mode on the selected message;

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1:
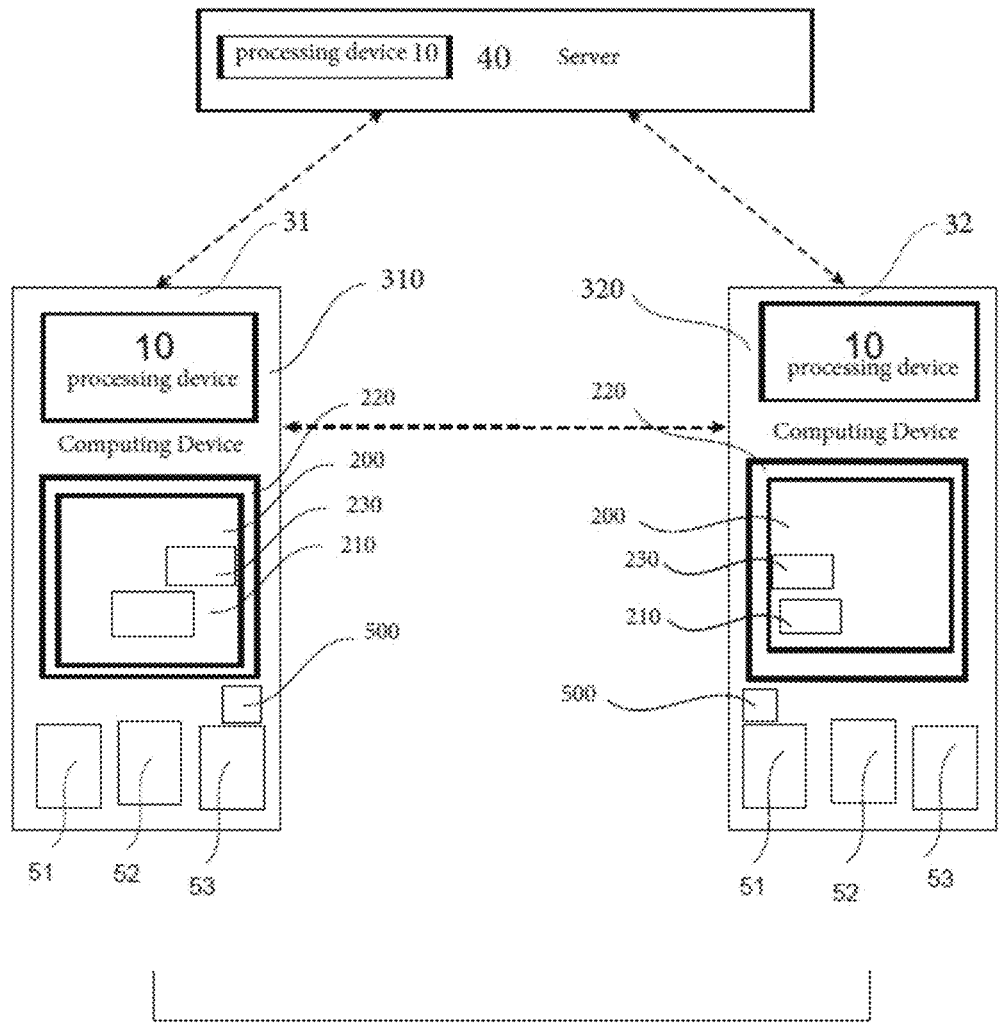
FIG. 1 depicts schematically the computing devices of the user (31), the computing device of the contact (32) and the server (40), each one of them with a processing device (10).

The main objective of the present invention is to provide a computer-implemented method for saving and one-sided reposting one or more selected messages (210) from messages (200) that are in a chat (220) of a user and a contact of a communication application that is performed by processing devices (10) running on a computing device of the user (31) and a computing device of the contact and possible also on a server (40) that is used by the communication application.

It is possible to implement the present invention on many kinds of messages, such as text messages, voice messages, video messages, photos, videos, emoji's, stickers, gifs, files and the like, and the term "messages" in this disclosure and in the claims refer to all these kinds of messages. The term "computing device" refers to any kind of smartphone, mobile device or a computer that is designed to have an internet connection. The term "processing device" refers to a processing device on a server or on the computing devices, or both.

The computer-implemented method includes the followings steps done by the following means:

Display by the computing devices of the user and the contact, the messages (200) in the chat (220) of the user and the contact in the communication application.

Display, by the computing device of the user, a save for future repost button (51) on a screen (310) of the computing device of the user (31) and possible also on a screen (320) of the computing device of the contact (32) for enabling the contact too to use the method as he wishes.

Apply, by using the save for future repost button on the screen of the computing device of the user, a save for future repost mode on the one or more selected messages (210) from the messages (200) that are in the chat.

The application of the save for future repost mode on the selected message is configured to:

(i) save, by the computing device of the user, the selected message on a memory (500) used or controlled by the communication application.

(ii) continue saving, by the computing device of the user or by a server used by the communication application, the selected message on the memory in the save for future repost mode while the selected message is in the chat.

(iii) continue saving, by the computing device of the user or by the server, the selected message on the memory in the save for future repost mode after deletion of the selected message from the chat.

(iv) continue saving, by the computing device of the user or by the server, the selected message on the memory in said save for future repost mode after restarting the computing device of the user; and (v) continue saving, by the computing device of the user or by the server, the selected message on the memory in said save for future repost mode for a period of at least thirty days from a moment of applying the save for future repost mode on the selected message;

In other words, the save for future repost mode is designed to be applied by using the save for future repost button on the screen of the computing device of the user. The application of the save for future repost mode on the one or more selected messages is designed to cause the computing device of the user or the server to save the one or more selected messages on the memory for long time, before and after the selected message is deleted from the chat, after the computing devices of the user and the contact were restarted, and even after several months after applying this mode.

The memory (500) can be a memory space in the computing device of the user or in the computing device of the contact that is used or controlled by the communication applications. This refers to the memory area of the computing device of the user or of the contact that the communication application takes over, so it is a kind of territory under its control, and the communication application can save the selected messages there, whatever will be done with them in the future depends on the application's software and features, and it is possible that the memory will be in the server of the communication application.

Display by the computing device of the user a repost button (52) on the screen of the computing device of the use.

Create a repost command by using the repost button on the computing device of the user that is configured to retrieve the saved selected message from the memory, for receiving the saved selected message from said memory, Repost, by the computing device of the user, on the screen of the computing device of the user said selected message retrieved (received) from said memory. From the explanations above it is clear that it is possible to retrieve and repost the selected message also by another computing device of the user (or the contact) in which they use this communication application, such as when normally users change their mobiles.

In another words and embodiment, send to the memory by the computing device of the user the repost command that is designed to be executed upon using the repost button on the screen of the computing device of the user only. The repost command is designed to cause the computing device of the user or the contact to send the selected messages that are stored on the memory, to receive by the computing device of the user from the memory the saved selected messages, upon sending the repost command and repost, by the computing device of the user, on the screen of the computing device of the user the received selected message.

It is possible that the computer-implemented method as described above will further include the steps of receiving the selected message stored on the memory also by the computing device of the contact (upon sending the repost command by the user) and not only to the computing device of the user, and also the step of reposting by the computing device of the contact on the screen of the computing device of the contact the received selected message. It is even preferably, that the method will provide the user with the option to execute this one-sided repost command to cause the repost to be done on his device only or on both devices, when he wants to remind or prove something to the contact.

The computer-implemented method may further include the step of displaying, by the mobile devices of the user and the contact, a save prevention button (53) on the screen of the computing device of the user and on the screen of the computing device of the contact. The save prevention button on the screen of the computing device of the contact is designed to cause the server or the computing device of the user to disable the mobile device of the user to apply save for future repost modes on the messages in said chat of the user and the contact (and the same is applies to the user), on the selected messages, or on another selected messages (230) selected by the contact. Means, that each side of a chat can enter the chat and select the option that disable the other side of saving messages from their chat for future one-sided repost. It is also possible, that when the contact select 'disable' as explained above, and the user tries to activate this option in the chat with that contact, then the method will display a notification that his contact disabled this option in their joint chat.

The present invention also discloses a computer system (300) for saving and one-sided reposting the one or more selected messages from the messages that are in the chat of the user and the contact of the communication application that comprises the processing devices running the computing devices of the user and the contact, and also possible on the server too. The computer system is configured to:

Display by the computing devices of the user and the contact the messages in their chat. Display by the computing device of the user (and possible of the contact too) the save for future repost button on the screen of the computing device of the user. As explained above, this button is designed to cause the mobile device of the user or the server to apply the save for future repost mode on the selected messages and the application of this mode is designed to cause the computing device of the user or the server to save these selected messages on the memory (500).

wherein the application of said save for future repost mode is configured to: (i) save, by the computing device of the user, the selected message on a memory used by the communication application; (ii) keep saving, by the computing device of the user or by a server used by the communication application, the selected message on said memory in said save for future repost mode while the selected message is in the chat; (iii) continue to keep saving, by the computing device of the user or by said server, the selected message on said memory in said save for future repost mode after deletion of the selected message from the chat; (iv) continue to keep saving, by the computing device of the user or by said server, the selected message on said memory in said save for future repost mode after restarting the computing device of the user; and (v) continue to keep saving, by the computing device of the user or by said server, the selected message on said memory in said save for future repost mode for a period of at least thirty days from a moment of applying said save for future repost mode on said selected message.

Display by the mobile device of the user or the server the repost button on the screen of the computing device of the user that is designed to cause the mobile device of the user to execute the repost command. And, display by the mobile device of the contact the save prevention button on the screen of the computing device of the contact The method of the present invention may be implemented in new or existing communication applications. The method enables the user of the communication application to save on the memory (500) important messages (text messages, voice messages, video messages, photos, videos, files, stickers, GIFs and emojis) that he thinks he may need to see or to show in future.

The buttons (51), (52) and (53) may be visible on the screens of the computing devices or may be invisible. Therefore the term "displaying" with regards to these buttons is illustrative. The use of these buttons may be done by tapping on or touching a graphic symbol on the screen of the computing devices, by tapping on or touching the screen of the computing devices in a certain way, by tilting the computing devices in a certain way, or in any other way that is commonly used to select an option or to execute an action on mobile devices with touch screens. The the term 'displaying a button' in this disclosure and in the claims means: providing the user with the option to execute the actions that these 'buttons' are designed to execute or perform, even though that the user's eye doesn't really see a button or anything on the screen. For example, placing three fingers on the screen and quickly sliding them down can cause some action on the device.

The method of the preset invention can be realized and performed through a feature that the operator of the communication application can add to it. The user can use this innovative feature by selecting one or more messages from the messages in the chat of the user and the contact in the communication application and to repost these saved selected messages on his computing device in the future whenever he wants.

The present invention meets a real and specific need, which is not answered by the patent mentioned in the introduction above. For example, a user can save a message he received from his lover in which she expresses her feelings, a user can save the address of a certain place (with which he corresponds in chat) and instead of scrolling back the chat box, he can simply make a one-sided repost and receive the saved message of the address, a lawyer can receive an important instruction from his client through a message (written, voiced, video message or in a file) (for example an instruction of a patent owner to his lawyer not to renew a registered patent), and the lawyer has an interest in keeping such messages in case of a dispute in the future; All these important messages should preferably be saved with or without the knowledge of the other party (the contact), and that they can be one-sided reposted at the decision of the user (the keeper) only, without the need for consent or action of the other party (the contact), and also, with the option of reposting the received message from the past on the keeper's device only (the user's computing device only).

It is also possible to save messages that are already in the box, and not only messages that arrive in the box after the feature is activated. The one-sided repost button may further configured to set time when the computing device of the user will send the one-sided repost command to the server or when the saved one or more selected messages will be sent from the server to the computing device of the user.

In one of the possibilities of applying the invention, the user can order that the saved messages be sent only to his device, or also to the device of the contact, and this is in the case, for example, when there is an argument about what was written between the user and the contact, and the contact is far away, so it is desirable that the contact receive the saved messages from the server to his device. This use can also constitute a kind of suggestive reminders, for example, a child sent a message to his parent that he will prepare lessons every evening, and in the event that on a particular evening the child does not sit down to prepare lessons, the parent can simply repost this saved message that will also reach the chat on the child's device, and he will understand the hint, or declaration of love that the partner saved and reposted after a long time to evoke sweet memories.

The selected messages are saved on the server; therefore, the possibility of losing the mobile phone (the computing device) does not create a fear of losing these saved messages. The saving of these messages is done separately from the possible standard saving of all the messages in the same communication application, because the standard saving can end at the decision of the operator of the communication application, the standard saving may disappear in case of changing the device and not downloading the history, on purpose or due to a mistake.

The fact that the saved messages come from the server of the company that operates the communication application gives these messages credibility in the event of a dispute (as opposed to a screenshot of the chat, for example, which can be manipulated), and the fact that the contact can also receive these saved message directly from the operator of the communication application gives credibility to messages that emerge from the distant past. Also, it is of course possible, and also desirable, that every message that arrives and is redisplayed on the device will bear the date and time it was originally sent, and an indication of who exactly sent each message to whom from among the saved messages coming from the server.

Figure 2:
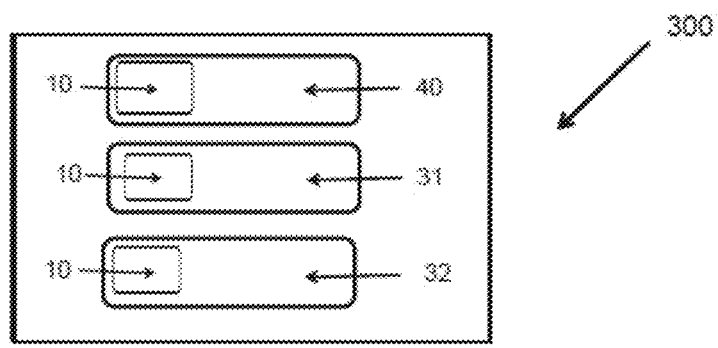
FIG. 2 depicts schematically system (300).

FIG. 1 depicts schematically the computing devices of the user (31), the computing device of the contact (32) and the server (40), each one of them with a processing device (10). FIG. 2 depicts schematically the system (300).

What we claimed is:

1. A computer-implemented method for saving and reposting a selected message from messages in a chat of a user and a contact of a communication application, the method comprising:
   (a) displaying, by a computing device of the user and a computing device of the contact, the messages in the chat of the user and the contact in the communication application;
   (b) displaying, by the computing device of the user, a save for future repost button on a screen of the computing device of the user;
   (c) applying, by using the save for future repost button on the screen of the computing device of the user, a save for future repost mode on the selected message;
   wherein the application of said save for future repost mode is configured to:
   (i) save, by the computing device of the user, the selected message on a memory used by the communication application;
   (ii) continue saving, by the computing device of the user or by a server used by the communication application, the selected message on said memory in said save for future repost mode while the selected message is in the chat;
(iii) continue saving, by the computing device of the user or by said server, the selected message on said memory in said save for future repost mode after deletion of the selected message from the chat;
(iv) continue saving, by the computing device of the user or by said server, the selected message on said memory in said save for future repost mode after restarting the computing device of the user; and
(v) continue saving, by the computing device of the user or by said server, the selected message on said memory in said save for future repost mode for a period of at least thirty days from a moment of applying said save for future repost mode on said selected message;
(d) displaying, by the computing device of the user, a repost button on the screen of the computing device of the user;
(e) creating a repost command, by using the repost button on the computing device of the user; wherein the creation of said repost command is configured to retrieve the saved selected message from said memory, and
(f) reposting, by the computing device of the user, on the screen of the computing device of the user said selected message retrieved from said memory.

2. The computer-implemented method of claim 1, further comprising:
displaying, by said computing device of said contact, a save prevention button on a screen of the computing device of the contact; and
applying, by using the save prevention button, a save prevention mode on said messages, said selected message, or on another selected messages by the contact in said chat; wherein the application of said save prevention mode is configured to disable said application of said save for future repost mode on said messages, said selected message, or on said another selected messages.

3. The computer-implemented method of claim 1, wherein said creation of said repost command is further configured to repost, by said computing device of said contact, on a screen of the computing device of the contact said selected message retrieved from said memory.

4. A computer system for saving and reposting a selected message from messages in a chat of a user and a contact of a communication application, comprising:
a processing device running on a computing device of the user,
a processing device running on a computing device of the contact, and
a server used by the communication application;
wherein the computer system is configured to:
(a) display, by a computing device of the user and a computing device of the contact, the messages in the chat of the user and the contact in the communication application;
(b) display, by the computing device of the user, a save for future repost button on a screen of the computing device of the user;
(c) apply, by using the save for future repost button on the screen of the computing device of the user, a save for future repost mode on the selected message;
wherein the application of said save for future repost mode is configured to:
(i) save, by the computing device of the user, the selected message on a memory used by the communication application;
(ii) continue saving, by the computing device of the user or by the server, the selected message on said memory in said save for future repost mode while the selected message is in the chat;
(iii) continue saving, by the computing device of the user or by the server, the selected message on said memory in said save for future repost mode after deletion of the selected message from the chat;
(iv) continue saving, by the computing device of the user or by the server, the selected message on said memory in said save for future repost mode after restarting the computing device of the user; and
(v) continue saving, by the computing device of the user or by the server, the selected message on said memory in said save for future repost mode for a period of at least thirty days from a moment of applying said save for future repost mode on said selected message;
(d) display, by the computing device of the user, a repost button on the screen of the computing device of the user;
(e) creating a repost command, by using the repost button on the computing device of the user, wherein the creation of said repost command is configured to retrieve the saved selected message from said memory, and
(f) repost, by the computing device of the user, on the screen of the computing device of the user said selected message retrieved from said memory.

5. The computer system of claim 4 that further is configured to:
display, by said computing device of said contact, a save prevention button on a screen of the computing device of the contact; and
apply, by using the save prevention button, a save prevention mode on said messages, said selected message, or on another selected messages by the contact in said chat; wherein the application of said save prevention mode is configured to disable said application of said save for future repost mode on said messages, said selected message, or on said another selected messages.

6. The computer system of claim 4, wherein said creation of said repost command is further configured to repost, by said computing device of said contact, on a screen of the computing device of the contact said selected message retrieved from said memory.

* * * * *